US 6,594,264 B1

(12) United States Patent
Lin et al.

(10) Patent No.: US 6,594,264 B1
(45) Date of Patent: Jul. 15, 2003

(54) VERSATILE SCHEDULER FOR ATM SWITCHES

(75) Inventors: Tzung-Pao Lin, Kaohsiung (TW); Maria C. Yuang, Hsinchu (TW); Hai-Yang Huang, Hsin-chu (TW); Jen-Ming Hah, Hsinchu (TW)

(73) Assignee: Industrial Technology Research Institute (TW)

( * ) Notice: Subject to any disclaimer, the term of this patent is extended or adjusted under 35 U.S.C. 154(b) by 0 days.

(21) Appl. No.: 09/198,518

(22) Filed: Nov. 24, 1998

(51) Int. Cl.$^7$ ............................................. H04L 12/24
(52) U.S. Cl. .................................. 370/395.42; 370/412
(58) Field of Search ................................. 370/230, 235, 370/395.42, 396, 400, 412

(56) References Cited

U.S. PATENT DOCUMENTS

| | | | | |
|---|---|---|---|---|
| 5,541,912 A | * | 7/1996 | Choudhury et al. | 340/825.5 |
| 5,555,264 A | * | 9/1996 | Sallberg et al. | 370/414 |
| 5,757,771 A | * | 5/1998 | Li et al. | 370/235 |
| 5,809,021 A | * | 9/1998 | Diaz et al. | 370/364 |
| 6,269,079 B1 | * | 7/2001 | Marin et al. | 370/230 |

OTHER PUBLICATIONS

Enrique J Hernandez–Valencia and Flavio G Bonomi; Simulation of a Simple Loss/Delay Priority Scheme for Shared Memory ATM Fabrics; IEEE, 1993, pp. 1389–1394 vol. 3.*
Jen M. Hah and Maria C. Yuang; "A Delay and Loss Versatile Scheduling Discipline in ATM Switches;" Mar. 29–Apr. 2, 1998; IEEE Infocom '98, The Conference on Computer Communications, vol. 2; pp. 939–946.
S.T. Liang and M.C. Yuang; "Performance Analysis of Earliest–Due–Date Scheduling Discipline for ATM Switches;" International Journal of Modelling and Simulation, vol. 17, No. 4, 1997; pp. 1–15.
Duan–Shin Lee and Bhaskar Sengupta; "Queueing Analysis of a Threshold Based Priority Scheme for ATM Networks," IEEE/ACM Transactions on Networking, vol. 1, No. 6, Dec. 1993; pp. 709–717.
Ren Chipalkatti, James F. Kurose, and Don Towsley; "Scheduling Policies for Real–Time and Non–Real–Time Traffic in a Statistical Multiplexer," IEEE 1989; pp. 774–783.
Parviz Yegani, Marwan Krunz, and Herman Hughes; "Congestion Control Schemes in Prioritized ATM Networks," IEEE 1994; pp. 1169–1172.
Joseph Y. Huh; "Resource Allocation for Broadband Networks;" IEEE 1988; pp. 1598–1608.
Arthur Y. M. Lin and John A. Silvester; "Priority Queueing Strategies and Buffer Allocation Protocols for Traffic Control at an ATM Integrated Broadband Switching System;" IEEE 1991; pp. 1524–1536.
S. Suri, D. Tipper, and G. Meempat; "A Comparative Evaluation of Space Priority Strategies in ATM Networks;" IEEE 1994; pp. 516–523.
Jen M. Hah and Maria C. Yuang; "Estimation–Based Call Admission Control with Delay and Loss Guarantees in ATM Networks."
H. Jonathan Chao and I. Hakan Pekcan; "Queue Management with Multiple Delay and Loss Priorities for ATM Switches;" IEEE 1994; pp. 1184–1189.
Yoshihiro Ohba, Masayuki Murata, Hideo Miyahara; "Analysis of Interdeparture Processes for Bursty Traffic in ATM Networks;" IEEE Journal on Selected Areas in Communications, vol. 9, No. 3, Apr. 1991; pp. 468–476.
Erwin P. Rathgeb, Modeling and Performance Comparison of Policing Mechanisms for ATM Networks; IEEE Journal on Selected Areas in Communications, vol. 9, No. 3, Apr. 1991; pp. 325–334.

* cited by examiner

*Primary Examiner*—Hassan Kizou
*Assistant Examiner*—Tim Spafford
(74) *Attorney, Agent, or Firm*—Finnegan, Henderson, Farabow, Garrett & Dunner, L.L.P.

(57) ABSTRACT

A message scheduler uses two thresholds to place cells into a queue. One determines, for a non-full queue, where to place high-delay-priority cells in relationship to low-delay-priority cells, and the other determines, for a fall queue, which low loss-priority cells to push out to make room for a high-loss-priority cell.

18 Claims, 11 Drawing Sheets

CD AND CLR UNDER VARIOUS BURSTINESS ($N_m=6$, $N_2=5$, AND $R=50$)
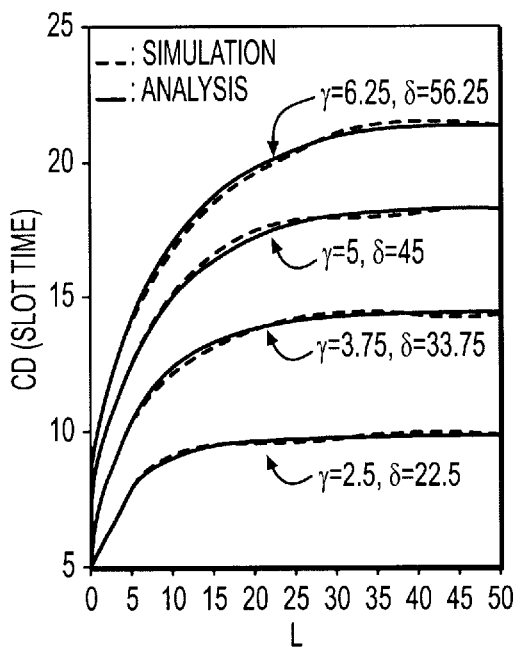
CD FOR M-STREAMS
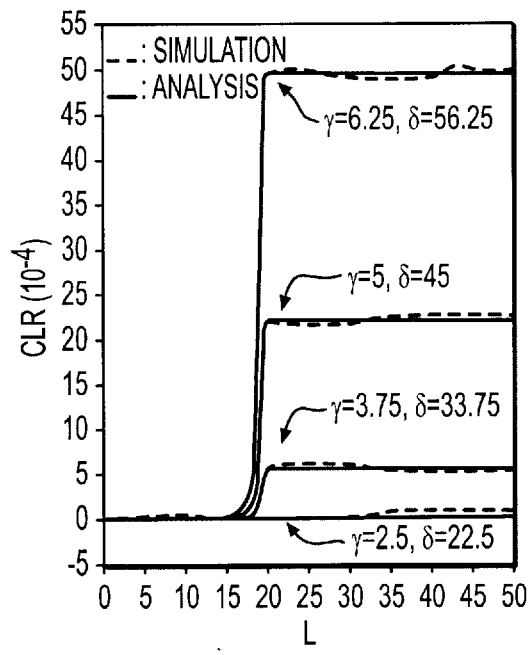
CLR FOR M-STREAMS
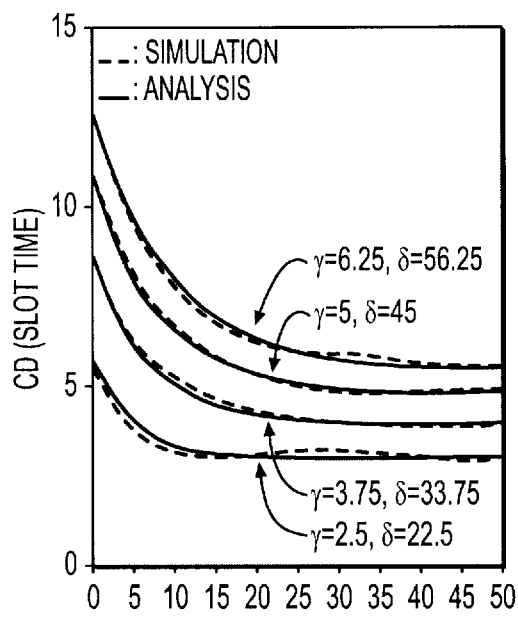
CD FOR I-STREAMS
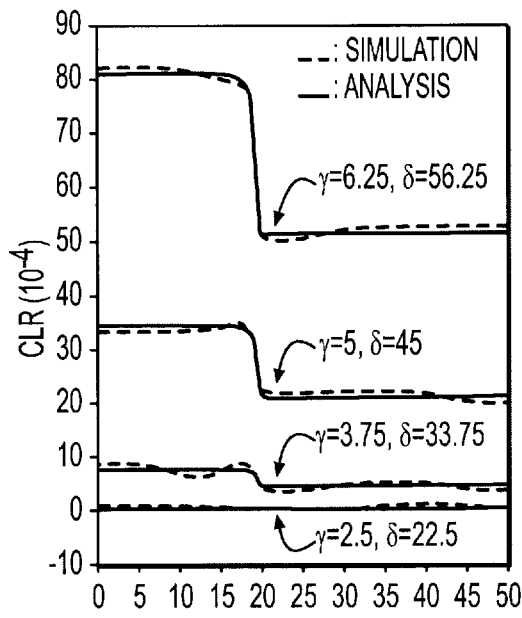
CLR FOR I-STREAMS
FIG. 7

VERSATILE SCHEDULER FOR ATM SWITCHES

I. BACKGROUND OF THE INVENTION

The present invention relates generally to network management, and more specifically to scheduling messages for Asynchronous Transfer Mode (ATM) networks.

As ATM technology becomes increasingly popular for Broadband ISDN, it must be able to support traffic having different Quality of Service (QoS) requirements, and this requires priority control in scheduling the transmission of cells in ATM messages. Thus, optimal use of network resources without sacrificing QoS requires that the ATM switches use proper scheduling disciplines to mediate the departure of ATM cells and discard cells on a priority basis. These priority-based scheduling disciplines fall into one of three main categories: delay-based, loss-based, or delay-and-loss-based.

In the delay-based category, the Head-Of-Line (HOL) discipline offers stringent delay guarantees for real-time cells but at the expense of increased buffering delays for non-real-time cells. Several disciplines attempt to control the performance tradeoff between real-time and non-real-time cells. The Minimum Laxity Threshold (MLT) and Earliest Due Date (EDD) disciplines manage the performance trade-off from the time perspective. The MLT discipline grants higher priority to real-time cells only when the minimum laxity (defined as the amount of time until the earliest deadline of a queued real-time cell expires) has not exceeded threshold L. The EDD discipline allows a real-time cell to precede non-real-time cells arriving not prior to slot time D.

The Queue Length Threshold (QLT) and Threshold Based Priority (TBP) disciplines manage the performance trade-off from a space perspective. The QLT discipline concedes ERON, precedence to real-time cells only when the number of queued non-real-time cells does not exceed a threshold T. The TBP discipline, on the other hand, allows real-time cells to take precedence when the number of queued real-time cells exceeds a threshold L.

These delay-based disciplines retain adequate QoS for real-time cells while offering the best possible service to non-real-time cells. The success of these disciplines hinges on the effective determination of the thresholds L, D, or T.

In the loss-based category, the Complete Buffer Partitioning discipline divides the queue into two regions dedicated to loss-sensitive and loss-insensitive cells, respectively. This discipline is prone to queue wastage, however, because no queue sharing takes place.

The Nested Threshold Cell Discarding (NTCD) (or partial buffer sharing) discipline allows loss-insensitive cells to share the queue until the queue occupancy reaches a threshold T. The NTCD discipline results in poor space utilization, however, when the loss-sensitive traffic load is low.

To alleviate the problem, the Push-Out buffer sharing (PO) discipline allows newly-arriving loss-sensitive cells to push out loss-insensitive cells if the queue is full. However, the PO discipline does not offer any adjustment of the Cell Loss Ratio (CLR) for any traffic class.

In a Threshold Push-Out (TPO) discipline, a loss-sensitive cell observing a full queue upon arrival can push out a loss-insensitive cell if the number of loss-insensitive cells exceeds a threshold T. In a $P^{ow}$Push-Out($P^{ow}$PO) discipline, a newly-arriving loss-sensitive cell observing a full queue can push out a loss-insensitive cell with probability $P^{ow}$.

To consider both delay and loss requirements in the delay-and-loss-based category, the Nested Threshold Cell Discarding with Multiple Buffers (NTCD-MB) discipline allows real-time cells to enter one smaller queue employing NTCD and allows loss-sensitive cells to enter another larger queue. Loss-sensitive cells are served only when there is no real-time cell in the smaller-size queue. This discipline offers stringent delay and loss guarantees for real-time cells and loss-sensitive cells, respectively, but wastes space because of two independent queues.

The Head-of-Line with Push-Out (HLPO) discipline uses HOL and PO disciplines for real-time cells and loss-sensitive cells, respectively. The HLPO discipline, however, does not provide any adjustment of the Cell Delay (CD) and CLR for any traffic class.

II. SUMMARY OF THE INVENTION

To provide an improved scheduling discipline, a scheduling method consistent with this invention comprises: (1) determining whether a message queue is full; (2) determining whether a newly-arriving cell is a high priority cell if the message queue is full; (3) placing the newly-arriving cell into the message queue before a predetermined number of low-priority cells in the queue if the newly-arriving cell is a high-delay-priority cell and if the queue is not full; and (4) placing the newly-arriving cell into the queue in the place of a selected low-priority cell in the queue if the queue is full, the newly-arriving cell is a high-loss-priority cell, and the selected low-loss-priority cell is located beyond a predetermined location in the queue.

A message scheduler consistent with this invention comprises a message queue and a processor for controlling the entry of cells into the queue. The processor includes (1) means for determining whether the message queue is full; (2) means for determining whether a newly-arriving cell is a high priority cell if the message queue is full; (3) means for placing the newly-arriving cell into the message queue before a predetermined number of low-priority cells in the queue if the newly-arriving cell is a high-delay-priority cell and if the queue is not full; and (4) means for placing the newly-arriving cell into the queue in the place of a selected low-priority cell in the queue if the queue is full, the newly-arriving cell is a high-loss-priority cell, and the selected low-loss-priority cell is located beyond a predetermined location in the queue.

Both the foregoing general description and the following detailed description are exemplary and explanatory only and do not restrict the invention claimed. The accompanying drawings, which are incorporated in and constitute a part of this specification, illustrate some systems and methods consistent with the invention and, together with the description, explain the principles of the invention.

III. BRIEF DESCRIPTION OF THE DRAWINGS

In the drawings,

FIGS. 6–10 are diagrams of the behavior of certain parameters for different threshold values.

IV. DETAILED DESCRIPTION OF THE PREFERRED EMBODIMENTS

Reference will now be made to apparatus and methods consistent with this invention, examples of which appear in the following drawings. In general, the same reference number s in different drawings refer to the same or similar elements. The following description is not intended to limit the scope of the invention, but rather to provide examples of that invention.

A. Overview

A versatile scheduling discipline for ATM switches, called Precedence with Partial Push-out (PPP), consistent with this invention, a supports two delay and two loss priorities, yet uses only a single queue to form messages. In one implementation, the PPP discipline uses two thresholds. One threshold, L, provides a delay guarantee by allowing a newly-arriving high-delay-priority cell to precede a maximum of L low-delay-priority cells in a non-fall queue.

Another threshold, R, provides a loss guarantee by permitting a newly arriving high-loss-priority cell to push out the last low-loss-priority cell located beyond the Rth location in a fall queue. By properly setting L and R, the PPP discipline can perform as a FCFS (First-Come, First-Served), HOL, PO, or HLPO discipline.

L and R values for a particular QoS can be determined automatically for the CD and CLR of high-delay-priority, low-loss-priority cells based on a discrete-time single-sever queuing model with two heterogeneous arrivals. These arrivals are represented by Bernoulli processes and Interrupted Bernoulli Processes (IBPs). The CD and CLR of low-delay-priority, high-loss-priority cells use a simple, algebra-based analysis to allow dynamic and effective adjustment of L and R for adequate delay and loss guarantees for high-priority cells while incurring only minimal performance degradation for other cell classes.

B. PPP Scheduling Discipline

As explained above, the PPP Scheduling Discipline allows a newly-arriving high-delay-priority cell to precede a maximum of L low-delay-priority cells in a non-full queue, and grants a newly-arriving high-loss-priority cell to push out the last low-loss-priority cell located beyond the Rth location in a full queue. For convenience, ranges [1, R] and [R+1, K] of the queue of size K constitute the "safe region" and the "push-out region," respectively.

Figure 1A:
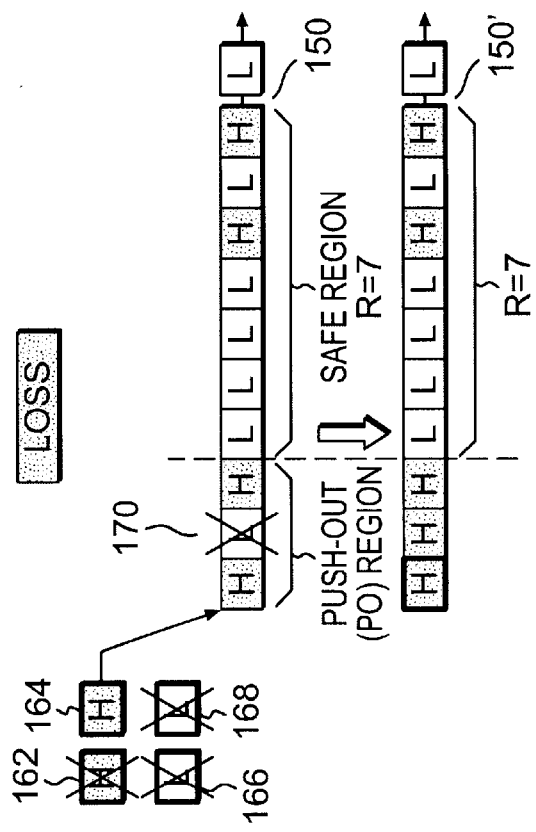
FIG. 1A is a diagram of a queue to demonstrate an example of the PPP discipline consistent with this invention for a non-full queue.

FIG. 1A is a diagram of a queue 110 to demonstrate an example of the PPP discipline consistent with this invention for a non-full queue when L equals 3. Queue 110 already has six cells, one low priority cell 112, L, followed by one high-delay-priority cell 114, H, and then four low-delay-priority cells 116, 118, 120, 122. When two high-delay-priority cells 132, 134, and two low-delay-priority cells 136, 138, arrive, the PPP discipline consistent with this invention places the two newly-arriving high-delay-priority cells 132, 134 before the last three (i.e., L) last low-delay-priority cells, and then places the two newly-arriving low-delay-priority cells 136, 138 after the last low-delay priority cell 122. The result is queue 110'.

Figure 1B:
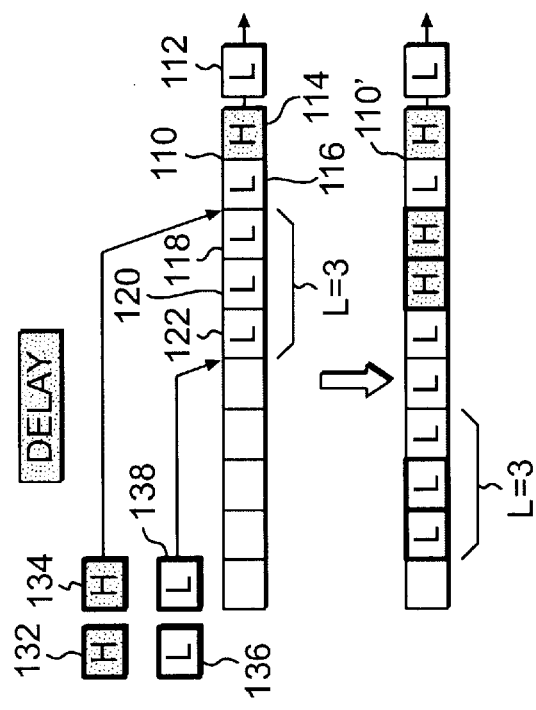
FIG. 1B is a diagram of a queue to demonstrate an example of the PPP discipline consistent with this invention for a fall queue

FIG. 1B is a diagram of a queue 150 to demonstrate an example of the PPP discipline for a full queue for R equal to 7, and the population HLHLLLLHLHL. When two high-loss-priority cells 162, 164, and two low-loss-priority cells 166, 168, arrive, they are not placed in first seven cells because those lie in the "safe region." One of the newly-arriving high-loss-priority cells 162 replaces the low loss-priority cell 170 that is not in the "safe region," forming queue 150'. The other cells are discarded.

Figure 2:
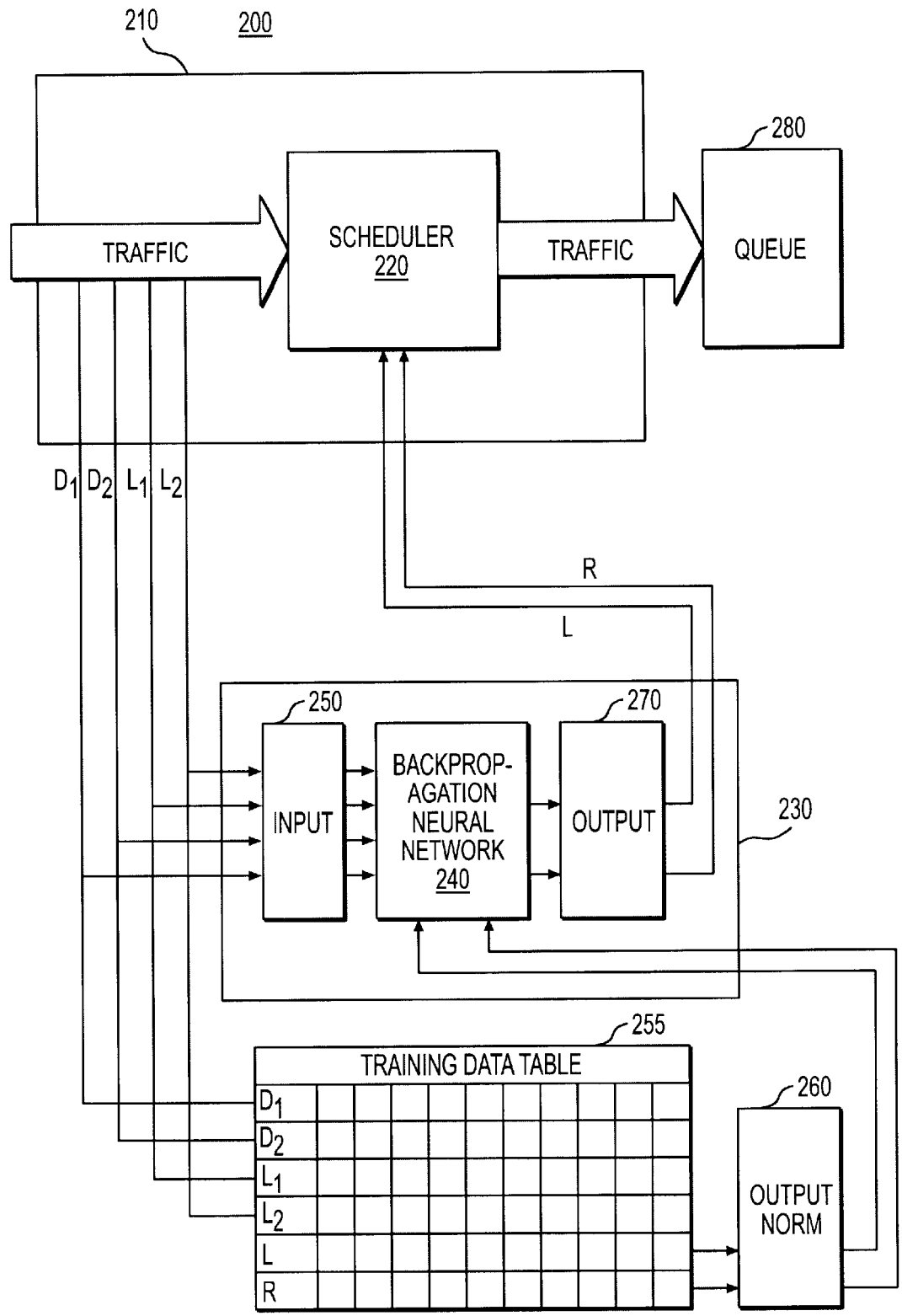
FIG. 2 shows one type of system that can implement the PPP Scheduling discipline consistent with this invention.

FIG. 2 shows one type of system 200 that can implement the PPP Scheduling discipline consistent with this invention. A controller 210 receives the cells and fills queue 280. Controller 210 includes a scheduler 220, which can include a microprocessor or other computing element, implementing the PPP discipline, and a neural network subsystem 230, which can be used to set parameters L and R. Controller 210 does not need neural network subsystem 230 to work in all instances, however, and controller 210 can instead set the parameters L and R any number of ways, such as manually or by table look-up.

Neural network subsystem 230 includes a backpropagation neural network 240 receiving traffic input from input normalization circuit 250. Once trained, neural network 240 formulates initial values of L and R from the traffic input. Then, output normalization inverse circuit 270 forms the final values for L and R that are fed to scheduler 220.

Data training table 255 and output normalization circuit 260 are used for off-line training. Off-line training involves building Training Data Table 255 for different combinations of $D_1, D_2, L_1, L_2$ by determining the most suitable values for L and R for the different combinations. Network 240 is trained by feeding it sets of values $(D_1, D_2, L_1, L_2, L, R)$, which adjust the weighting of nodes in the network. Network 240 then forms intermediate estimates L' and R', and the feedback mechanism in network 240 compares L' and R' to L and R, and uses the differences to adjust the weighting of the nodes to produce the results from Table 255. At this point, network 240 is trained, and when values of $(D_1, D_2, L_1, L_2)$ are received in real time, network 240 produces appropriate values of L and R.

Figure 3:
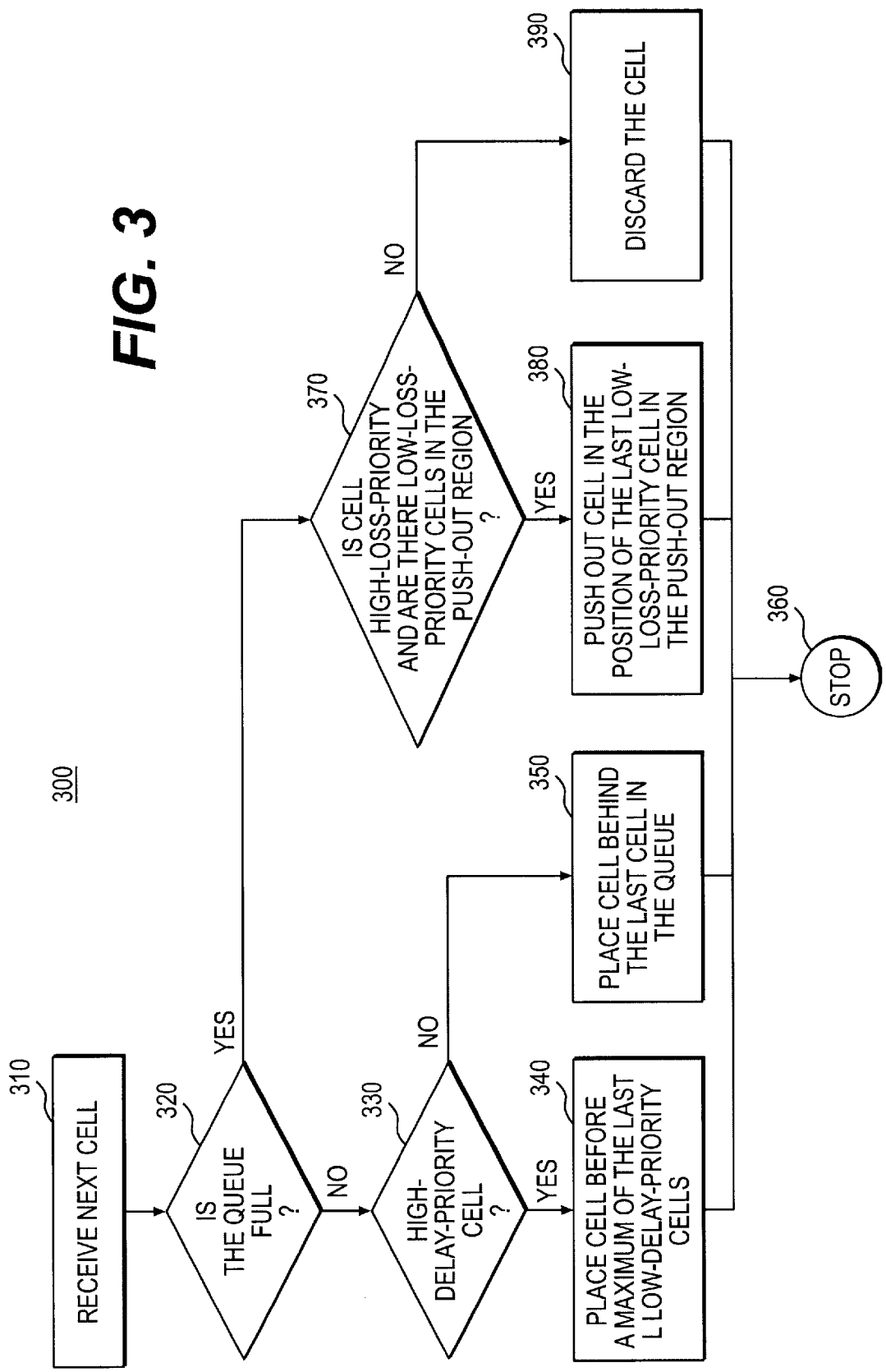
FIG. 3 is a flow diagram of a preferred implementation of the PPP discipline consistent with this invention.

FIG. 3 is a flow diagram 300 of a preferred implementation of the PPP discipline. When a cell arrives (Step 310), scheduler 220 examines it to see whether the queue is full (Step 320). If not, the cell is examined to see whether it is a high-delay-priority cell (Step 330). If so, the cell is placed in the queue ahead of a maximum of the last L low-delay-priority cells (Step 340). Otherwise, the low-delay-priority cell is placed behind the last cell in the queue (Step 350). After these actions, the procedure is finished with regard to the current cell (Step 360), unless, of course, later events evict it from the queue.

If the queue is full (Step 320), scheduler 220 determines whether the cell is a high-loss-priority cell, and whether there are low-loss-priority cells in the push-out region (Step 370), which, as explained above, is the push-out region is that portion of the queue beyond the Rth location. If so, the high-loss-priority cell pushes out the last-low-loss-priority cell in the push-out region by (1) removing the last low-loss-priority cell in the push-out region; (2) shifting all high-loss-priority cells ahead one position; and (3) placing the newly arriving high-loss-priority cell in the last position of queue 280 (Step 380). Otherwise, the cell is discarded (Step 390), and the next cell is examined (Step 360).

If multiple cells arrive in the same time slot, the high-delay-priority cells take precedence in entering the queue. Also, if multiple cells of the same priority arrive, they enter the queue in a random manner. Otherwise, the cells are served sequentially.

The FCFS, HOL, PO, and HLPO disciplines are all special cases of the PPP discipline. For example, the PPP discipline behaves as an FCFS discipline if L is set to zero and R is set to K; as an HOL discipline if L and R are both set to K; as a PO discipline if L and R are both set to zero; and as an HLPO discipline if L is set to K and R is set to zero.

Figure 4:
FIG. 4 is a diagram showing how PPP discipline operates for certain thresholds.

FIG. 4 is a diagram showing how the PPP discipline operates when L=3, R=6, and K=10. The number, $x^y$, tagged in each cell denotes the xth-arriving cell in Class y. In Class y, y=0 denotes the high-delay-priority and high-loss-priority class, y=1 denotes the high-delay-priority and low-loss-priority class, y=2 denotes the low-delay-priority and high-loss-priority class, and y=3 denotes the low-delay-priority and low-loss-priority class.

In the first slot time (where slots are fixed in length), $1^0$, $1^1$, $1^2$, $1^3$, $2^2$, and $2^3$ arrive. Because cells $1^0$ and $1^1$ are high-delay-priority, they are placed in the queue before simultaneously arriving low-delay priority cells $1^2$, $1^3$, $2^2$, and $2^3$. In the second slot time, cells $2^0$, $2^1$, $3^1$, $3^2$, $3^3$, and $4^2$ arrive. Because L is set to 3, high-delay-priority cells $2^1$, $2^0$, and $3^1$ precede low-delay-priority cells $1^2$, $2^2$, and $2^3$. In the third slot time, the queue is full after high-delay-priority cell $4^1$ enters. Next, high-loss-priority cells $5^2$ and $6^2$ sequentially push out low-loss-priority cells $4^1$ and $3^3$, respectively, from the push-out region. Moreover, high-loss-priority cell $7^2$ is discarded since there is no low-loss-priority cell in the push-out region. Low-loss-priority cell $4^3$ is also discarded since the queue is full.

C. Queuing Model and Analysis

Any nonbursty source stream (such as files, or any stream output from a traffic shaper) can be modeled as a Bernoulli process (called the M-stream), whereas any bursty source stream (such as voice, or video) can be modeled as an IBP (called the I-stream). The I-stream comprises new cells sent out from a bursty source, like compressed video data, where the amount of data size changes vary significantly according to the different compression rates. An M-stream comprises new cells from a nonbursty source, in which the amount of data does not change greatly.

For M-streams, let $N^M$ be the number of M-streams and $R^M$ be the mean cell arrival rate (cells/slot time) for each M-stream. The probability mass function (pmf) of the number of M-cells (i.e., cells from an M-stream) arriving in a slot time, denoted as m(j), follows a binomial distribution, namely $$m(j) = \binom{N_M}{j} \cdot R_M^j \cdot (1 - R_M)^{N_M - j}.$$

For I-streams, let $N_I$ be the number of I-streams. In one slot time, an I-stream changes state from ON to OFF with probability 1-α and from OFF to ON with probability 1-β per slot. An I-stream generates a cell by a rate of λ in the ON state and generates no cell in the OFF state. The pmf of the number of I-cells arriving in a slot time given i I-streams in the ON state, denoted as $b_i(j)$, follows a binomial distribution, namely $$b_i(j) = \binom{i}{j} \cdot \lambda^j \cdot (1 - \lambda)^{i-j},$$

and the transition probability, $P_{h,i}$, that the number of I-streams in the ON state changes from h to i can be obtained as follows:

$$P_{h,i} = \sum_{x=0}^{h} \binom{h}{x} \alpha^x (1-\alpha)^{h-x} \binom{N_I - h}{i - x} (1 - \beta)^{i-x} \beta^{N_I - h - (i-x)}.$$

Moreover, each ATM switch is assumed to employ an output buffering mechanism in the PPP discipline. Each output buffer (buffer size=K) of a switch thus becomes $$M^{[N_M]} + I^{[N_I]}/D/1/K.$$

During system operation in this example, three simultaneous events occur at the beginning of each slot time: Event (1) the number of I-streams in the ON state changes; Event (2) I-cells arrive; and Event (3) M-cells arrive. At the end of each slot time, the cell in the server departs, which is Event (4). To assess the performance of the PPP discipline under these constraints, system occupancy distribution will be derived and used to compute two performance metrics, CD and CLR, which serve as the foundation for determining L and R.

1. System Occupancy Distribution

Figure 5:
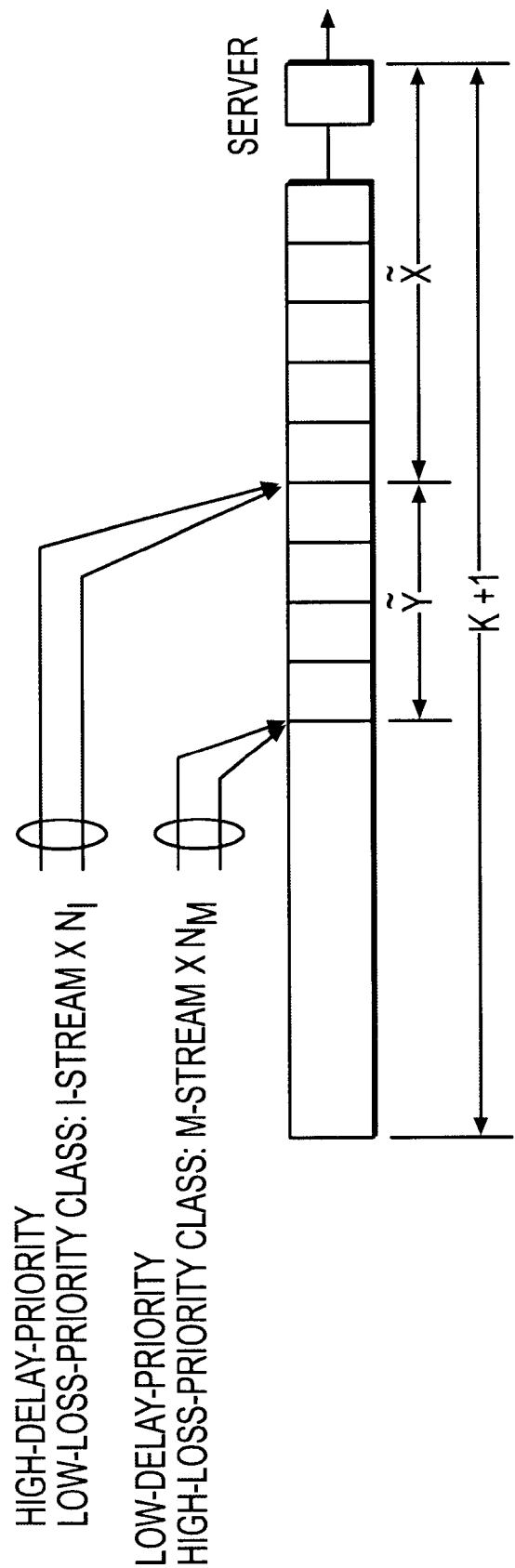
FIG. 5 is a model of a queue for analytical purposes.

System occupancy distribution, for a system including the server and the queue, will be derived for each slot time. FIG. 5 is a model of a queue for this analysis. It shows $\tilde{X}$ and $\tilde{Y}$ as representing the number of queued cells that cannot be and can be, respectively, preceded by newly-arriving I-cells. For this analysis, $\tilde{I}$ is the number of I-streams in the ON state, and the system occupancy distribution, denoted as f(j, l, i), is defined as the pmf of $\tilde{X}$, $\tilde{Y}$, and $\tilde{I}$.

If $f^{(n)}(j, l, i)$ and $\overline{f^{(n)}}(j,l,i)$ represent the system occupancy distribution observed at the nth slot time after the occurrence of Events (1) and (4), respectively, $f^{(n)}(i, l, i)$ is related to $\overline{f^{(n-1)}}$ (j,l,h), $0 \leq h \leq N_I$ by $$f^{(n)}(j, l, i) = \sum_{h=0}^{N_I} (P_{h,i} \cdot \overline{f^{(n-1)}}(j, l, h)), 0 \leq j \leq K, 0 \leq l \leq L, 0 \leq i \leq N_I, \quad (1)$$

where $P_{h,i}$ is the transition probability defined in the previous subsection, because $\tilde{X}$ and $\tilde{Y}$ both do not be changed after the occurrence of Event (1).

After the occurrence of Event (2), the newly-arriving I-cells are placed behind the $\tilde{X}\tilde{i}$, queued cell because these cells can precede Σ M-cells. Thus, $\tilde{X}$ is increased by the number of I-cells up to $K+1-\tilde{Y}$, where K+1 is the maximum number of cells in the system. Because the pmf of the sum of two independent random variables is the convolution of the individual pmfs, the system occupancy distribution observed at the nth slot time after the occurrence of Event (2), $\tilde{f}^{(n)}(j,l,.)$, can be obtained by $$\tilde{f}^{(n)}(j,l,i) = MIN_X[f^{(n)}(j,l,i) \oplus b^i(j)], 0 \leq j \leq K+1, 0 \leq l \leq L, 0 \leq i \leq N_I \quad (2)$$

where $\oplus$ is the convolution operator, and $MIN_X$ is the function defined as $$MIN_X(g(j, l, i)) = \begin{cases} g(j, l, i) & j < K + l - l; \\ \sum_{h=K+l-l}^{\infty} g(h, l, i) & j = K + l - l; \\ 0 & \text{otherwise} \end{cases} \quad (3)$$

After the occurrence of Event (3), the newly-arrived M-cells are placed behind the last cell in the queue.

Therefore, $\tilde{Y}$ is increased by the number of M-cells that arrived, but only up to a maximum of L. In addition, $\tilde{X}$ has to be readjusted because L is the maximum number of M-cells that can be preceded by I-cells. This requires increasing $\tilde{X}$ by a value ($\tilde{Y}$+# of arriving M-cells–L) if the number that ($\tilde{Y}$+# of arriving M-cells) would have exceeded L, but only up to a maximum of K+1−$\tilde{Y}$. Moreover, due to the non-preemptive property of the server, the M-cell in the server will not be preceded by the next-arriving I-cell. If there are only M-cells in the system, namely $\tilde{X}$=0 and $\tilde{Y}$>0, $\tilde{X}$ is increased by 1 and $\tilde{Y}$ is decreased by 1. The system occupancy distribution observed at the nth slot time after the occurrence of Event (3), $f^{(n)}(j,l,i)$, can be given as $$f^{\overline{(n)}}(j, l, i) = \begin{cases} MIN_X\left(MIN_Y\left(f^{\overline{(n)}}(1, l, i) \oplus m(l)\right)\right) + \\ \quad MIN_X\left(MIN_Y\left(f^{\overline{(n)}}(0, l+1, i) \oplus m(l+1)\right)\right) & j=1, 0 \le l < L; \\ 0 & j=0, 1 \le l \le L; \\ MIN_X\left(MIN_Y\left(f_i^{\overline{(n)}}(j, l, i) \oplus m(l)\right)\right) & \text{otherwise}, \end{cases} \quad (4)$$

where $MIN_y$ is the function defined as:

$$MIN_Y(g(j, l, i)) = \begin{cases} g(j, l, i) & l < L; \\ \sum_{h=0}^{\infty} g(j-h, l+h, i) & l = L; \\ 0 & \text{otherwise.} \end{cases} \quad (5)$$

After the occurrence of Event (4), each cell shifts ahead one system location, so $\tilde{X}$ decreases by 1 but only down to 0. Again, because of the non-preemptive property of the server, the M-cell in the server will not be preceded by the next-arriving I-cell. Accordingly, $\overline{f^{(n)}}$ (j,l,i) becomes $$f^{\overline{(n)}}(j, l, i) = \begin{cases} MAX\left(f^{\overline{(n)}}(1, l, i)\right) + MAX\left(f^{\overline{(n)}}(0, l+1, i)\right) & j=1, 0 \le l < L; \\ 0 & j=0, 1 \le l \le L; \\ MAX\left(f^{\overline{(n)}}(j, l, i)\right) & \text{otherwise}, \end{cases} \quad (6)$$

$$MAX(g(j, l, i)) = \begin{cases} g(0, l, i) + g(1, l, i) & j=0; \\ g(j+1, l, i) & 1 \le j \le K-1. \\ 0 & \text{otherwise.} \end{cases} \quad (7)$$

where MAX is the function defined as
From Equations (1), (2), (4), and (6), $$f(j,l,i) = \lim_{n \to \infty} f^{(n)}(j,l,i), \ 0 \le j \le K+0 \le l \le L, \ 0 \le i \le N_I, \quad (8)$$

with initial condition, $$\sum_{i=0}^{N_I} \sum_{l=0}^{L} \sum_{j=0}^{K} \overline{f^{(0)}}(j, l, i) = 1.$$

2. CD and CLR for I-cells

To compute the system time distributions, CD and CLR, for I-cells based on the previously derived system occupancy distribution f(j, l, i), $\tilde{Z}$ is used to denote the system location in which the observed I-cell (the $I^0$-cell) is placed upon its arrival. In this sense, $\tilde{Z}$ also acts as a metric for determining whether the $I^0$-cell will be pushed out at later time, and represents the sum of (1) the order by which the $I^0$-cell is served among simultaneously-arriving cells, and (2) the number of queued cells that cannot be preceded by the $I^0$-cell. The pmf of the first term for $\tilde{Z}$, given i I-streams in the ON state, $r_i(j)$, must be found. The pmf of the second term for $\tilde{Z}$ can be indirectly obtained from the system occupancy distribution observed by I-cells, denoted by $\hat{f}(j,l,i)$.

To derive $r_i(j)$, $\overline{B}_{i,\overline{0}}$ denotes the positive number of I-cells arriving in a slot time given i I-streams in the ON state, and $b_{i,\overline{0}}(h)$ represents its pmf. The value $b_{i,\overline{0}}(h)$ equals $b_i(h)/(1-b_i(0))$. Moreover, let $\overline{B}_{i,\overline{0}}$ denote the positive number of I-cells including the $I^0$-cell arriving in a slot time given i I-streams in the ON state, and $\hat{b}_{i,\overline{0}}(h)$ be its pmf. From renewal theory $\hat{b}_{i,0}(h)$ is obtained as $\hat{b}_{i,\overline{0}}(h) = h \cdot b_{i,\overline{0}}(h)/E[\overline{B}^i{}_{,0}]$, where E is the mean function.

$$r_i(j) = \sum_{h=i}^{N_I} \frac{b_{i,0}(h)}{h}, \ 1 \le j \le N_I, \ 0 \le i \le N_I, \quad (9)$$

where I/h is the probability that the $I^0$-cell is served the jth among h I-cells.

To derive $\hat{f}(j,l,i)$ on the basis of f(j,l,i), $\overline{I}_{\overline{0}}$ is the positive number of I-streams in the ON state, and $\phi_0(i)$ is its pmf. The value $\phi_0(i)$ is expressed as $\phi(i)/(1-\phi(0))$, where $\phi(i)$ is the probability of i I-streams in the ON state. Further, $\overline{I}_{\overline{0}}$ is the positive number of I-streams including the source of the $I^0$-cell in the ON state, and $\hat{\phi}_{\overline{0}}(i)$ is its pmf. Again, from renewal theory, $\hat{\phi}_{\overline{0}}(i)$ is $i \cdot \phi_0(i)/E[\overline{I}_{\overline{0}}]$. The term $\hat{f}(j,l,i)$ is determined at each slot time upon the arrivals of I-cells as:

$$\Sigma_{i=0}^{L} \Sigma_{j=0}^{K} \hat{f}(j,l,i) = \hat{\phi}_{\overline{0}}(i) \text{ and } \Sigma_{i=0}^{L} \Sigma_{j=0}^{K} f(j,l,i) = \hat{\phi}(i)$$

Because $\overline{X}$=a, $\overline{Y}$=b, and $\overline{I}$=c, the ratio of $\hat{f}$(a,b,c) to f(a,b,c) equals $\hat{\phi}_{\overline{0}}(c)/\phi(c)$, and $$\hat{f}(j,l,i) = f(j,l,i) \cdot \hat{\phi}_{\overline{0}}(i)/\phi(i), \ 0 \le j \le K \le 0 \le l \le L, \ 0 \le i \le N_I. \quad (10)$$

Knowing $r_i(j)$ and $\hat{f}(j,l,i)$ allows determination of the system time distribution for I-cells, denoted as $s_I(j)$. According to the system location $\overline{Z}$, $s_I(j)$ can be examined from three different conditions: (i) the $I^0$-cell is in the safe region or the server upon its arrival, (ii) the $I^0$-cell observes a full queue upon its arrival, and (iii) the $I^0$-cell is in the push-out region.

a. Case (i)

For the first condition, namely $1 \le \overline{Z} \le R+1$, the system time distribution for the $I^0$-cell equals $\overline{Z}$. From Equations (9)–(10), the system time distribution $s_I(j)$, $1 \le j \le R+1$, can be given as:

$$s_I(j) = \sum_{i=0}^{N_I} \sum_{l=0}^{L} \left(\hat{f}(j, l, i) \oplus r_i(j)\right), \ 1 \le j \le R+1. \quad (11)$$

b. Case (ii)

For the second condition, namely $\overline{Z} > K+1-\overline{Y}$ the system time for the $I^0$-cell is not considered because that cell is discarded from the system. On the basis of Equation (9)–(10), the CLR for the $I^0$-cell, $\vec{L}_1$, is $$\vec{L} = \sum_{i=0}^{N_I} \sum_{l=0}^{L} \sum_{j>K+1-l}^{\infty} (\hat{f}(j,l,i) \oplus r_i(j)). \quad (12)$$

c. Case (iii)

For the third condition, namely $R+2 \leq \overline{Z} \leq K+1-\overline{Y}$, the $I^0$-cell may be pushed out before it is shifted into the safe region. To evaluate the push-out effect on the system time distribution for the $I^0$-cell in the following context, $\overline{V}$ is defined as the number of M-cells queued behind the $I^0$-cell, and $u^{(n)}(j, l, i)$ denotes the probability that the $I^0$-cell is still in the push-out region where $\overline{Z}=j$, $\overline{V}=l$, and $\overline{I}=i$, which is observed before the occurrence of Event (3) at the nth slot time after the $I^0$-cell has arrived. Because the push-out region is from $R+2$ to $K+1$, n falls between 0 and $K-R-1$. From Equations (9)–(10), $$u^{(0)}(j, l, i) = \quad (13)$$
$$\begin{cases} \hat{f}(j,l,i) \oplus r_i(j) & 0 \leq l \leq L, R+2 \leq j \leq K+1-l, 0 \leq I \leq N_I, \\ 0 & \text{otherwise.} \end{cases}$$

After Event (3) occurs, at the nth slot time after the $I^0$-cell has arrived, newly-arriving M-cells are placed behind the last queued cell. Thus, $\overline{V}$ increases by the number of these newly-arrived M-cells. The $I^0$-cell is pushed out if $\overline{V}$ exceeds the maximum number of M-cells queued behind the $I^0$-cell, namely $\overline{V} > K+1-\overline{Z}+n$.

After Event (4) occurs during the nth slot time, the $I^0$-cell is shifted ahead one system location, so the $I^0$-cell shifts into the safe region if the $I^0$ cell is placed at the $(R+2+n)$th system location upon its arrival, namely $\overline{Z}=R+2+n$. Therefore, before Event (3) occurs at the $(n+1)$th slot time, the $I^0$-cell stays in the push-out region if the $I^0$-cell is not pushed out and does not shift into the safe region, i.e., $) \leq \overline{V} \leq K+1-\overline{Z}+n$ and $R+2+n<\tilde{Z} \leq K+1$ Accordingly, $u^{(n+1)}(j, l, i)$ is related to $u^{(n+1)}(j, l, i)$ by $$u^{(n+1)}(j, l, i) = \quad (14)$$
$$\begin{cases} u^{(n)}(j, l, i) \oplus m(l) & 0 \leq n \leq K-R-2, R+2+n < j \leq K+1 \\ & 0 \leq l \leq K+1-j+n, 0 \leq i \leq N_i, \\ 0 & \text{otherwise.} \end{cases}$$

Moreover, the CLR for the $I^0$-cell during the nth slot time, $L_I^{(n)}$, is $$L_I^{(n)} = \sum_{i=0}^{N_I} \sum_{j=R+2-n}^{K-1} \sum_{l>K+1-j+n}^{\infty} (u^{(n)}(j,l,i) \oplus m(l)), \quad (15)$$

$$0 \leq n \leq K-R-1,$$

and the system time distribution $s^i(j)$, $j=R+2+n$, is $$s_I(j) = \sum_{i=0}^{N_I} \sum_{l=0}^{K+1-j+n} (u^{(n)}(j,l,i) \oplus m(l)), \quad (16)$$

$$0 \leq n < K-R-1, j = R+2+n.$$

From Equations (12) and (15), the CLR for I-cells ($L^I$) is $$L_I = \vec{L}_I + \sum_{n=0}^{K-R-1} L_I^{(n)}, \quad (17)$$

and from Equations (11), (16), and (17), the CD for I-cells ($D^I$) can be expressed as:

$$D_I = \sum_{j=1}^{K-1} \frac{j \cdot s_I(j)}{(1-L_I)} \quad (18)$$

3. CD and CLR M-cells

Deriving the CD and CLR for M-cells (denoted as $D^M$ and $L^M$) uses a simple, algebra-based analysis. $\hat{D}_M$ and $\hat{L}_M$ ($\hat{D}_I$ and $\hat{L}_I$), the CD and CLR for M-cells (I-cells derived from the FCFS discipline), respectively, will ultimately be indirectly inferred from $D_I$, $L_I$, $D_I$, $L_I$, $\hat{D}_I$, $\hat{L}_I$, $\hat{D}_I$, and $\hat{L}_I$.

Table 1 summarizes the variables used in this algebraic analysis.

TABLE 1

Variables used throughout the algebraic analysis

| Variable | Definition |
|---|---|
| $D_M$, $L_M$ ($D_I$, $L_I$) | CD, CLR of M-cells (I-cells) |
| $D_M$, $L_M$ ($D_I$, $L_I$) | CD, CLR of M-cells (I-cells) based on FCFS |
| $Q_M$ ($Q_I$) | Total number of M-cells (I-cells) which have been discarded |
| $Q_M$ ($Q_I$) | Total number of M-cells (I-cells) which have been discarded based on FCFS |
| $A_m$ ($A_I$) | Total number of M-cells (I-cells) which have arrive |
| F | Ratio of $A_m$ ($A_I$) |
| $N_M$ ($N_I$) | Number of M-streams (I-streams) |
| $R_M$($R_I$) | Mean cell arrival rate of an M-stream (I-stream) |
| $F_m$ ($F_I$) | Total sojourn time of M-cells (I-cells) which have departed |
| $F_m$ $F_I$ | Total sojourn time of M-cells (I-cells) which have departed based on FCFS |
| $\epsilon_m$ ($\epsilon_I$) | Total number of M-cells (I-cells) which have departed |
| $\vec{D}_I$ | Mean sojourn time of pushed-out I-cells |
| $\vec{F}_I$ | Total sojourn time of pushed-out-I-cells |

To derive $L_M$, $$L_M = \frac{C_M}{A_M}, L_I = \frac{C_I}{A_I}, \text{ and } F = \frac{A_M}{A_I} = \frac{N_M \cdot R_M}{N_I \cdot R_I}. \quad (19)$$

Therefore, $$C_M + C_I = A_M \cdot L_M + A_I \cdot L_I = A_I (F \cdot L_M + L_I), \text{ and} \quad (20)$$

At each slot time, the total number of cells which have been discarded based on the PPP $$\hat{C}_M + \hat{C}_I = A_M \cdot \hat{L}_M + A_I \cdot \hat{L}_I = A_I (F \cdot \hat{L}_M + \hat{L}_I) \quad (21).$$

discipline (i.e., $Q_M + Q_I$) is identical to that based on FCFS (i.e., $\hat{Q}_m + \hat{Q}_I$) Accordingly, on the basis of Equations (20) and (21), $L_M$ can be given as $$L_M = \frac{F \cdot \hat{L}_M + \hat{L}_I - L_I}{F} \quad (22)$$

$D_M$, $D_I$, and $\overline{D}_I$ are derived as follows:

$$D_M = \frac{F_M}{\xi_M}, \quad D_I = \frac{F_I}{\xi_I}, \quad \text{and} \quad \vec{D}_I = \frac{\vec{F}_I}{A_I} = \sum_{n=0}^{K-R-1} (n \cdot L_I^{(n)}), \quad (23)$$

where $L_I^{(n)}$ is the probability that the sojourn times of a pushed-out I-cell is n slot time. $L_I^{(n)}$ has been derived in Equation (15). From Equation (19), $\xi_M$ and $\xi_I$ can be expressed as $\xi_M = A_M - C_M = A_M - A_M L_M = A_I \cdot F \cdot (1-L_M)$, and $\xi_I = A_I - C_I = A_I - A_I L_I = A_I (1-L_I).$ (24)

Therefore, Equations (23) and (24) lead to $$F_M + F_I + \vec{F}_I = \xi_M \cdot D_M + \xi_I \cdot D_I + A_I \cdot \vec{D}_I \quad (25)$$
$$= A_I \cdot (F \cdot (1-L_M) \cdot D_M + (1-L_I) \cdot D_I + \vec{D}_I),$$

and $$\hat{F}_M = \hat{F}_L = A_I \cdot (F \cdot (1-\hat{L}_M) \cdot \hat{D}_M + (1-\hat{L}_I) \cdot \hat{D}_I) \quad (26)$$

Moreover, because the sum of numbers of cells in the system observed at each slot time is identical to the total sojourn time of cells, the total sojourn time of cells based on the PPP discipline (i.e., $F_M + F_I + \vec{F}_I$) is identical to that based on FCFS (i.e., $\hat{F}_M + \hat{F}_I$). On the basis of Equation (25) and (26), $D_M$ can be given as:

$$D_M = \frac{F \cdot (1 - \hat{L}_M) \cdot \hat{D}_M + (1 - \hat{L}_I) \cdot \hat{D}_I - (1-L_I) \cdot D_I - \vec{D}_I}{F \cdot (1-L_M)} \quad (27)$$

4. Simulation Results

To verify the accuracy of analyses, tests were run using MALTLAB and time-based simulation was implemented in the C language. The program for analytic computation terminated when all entries of matrix $|f^{(n)}(j,1,i) - f^{(n-1)}(j,1,i)|$ were dropped to $10^{-6}$ and below. The simulation program terminated upon detection of a loss of $10^4$ cells. Characteristics of traffic classes are summarized in Table 2.

TABLE 2

Characteristic of traffic classes

| Traffic Class | Traffic Parameter | Delay QoS Requirement | Delay Priority | Loss QoS Requirement | Loss Priority |
|---|---|---|---|---|---|
| M | $R_M = 0.05$ | 60 slot time | Low | $1 \cdot 10^{-6}$ | High |
| I | $\gamma = 5; \delta = 45,$ $\lambda = 1.0$ | 15 slot time | High | $5 \cdot 10^{-3}$ | Low |

Legend:
$R_M$ = Mean cell arrival rate (cell/slot time) for an M-stream;
$\gamma$ = Mean ON length for an I-stream;
$\delta$ = Mean OFF length for an I-stream;
$\lambda$ = Mean cell arrival rate for an I-stream in the ON state.

Figure 6:
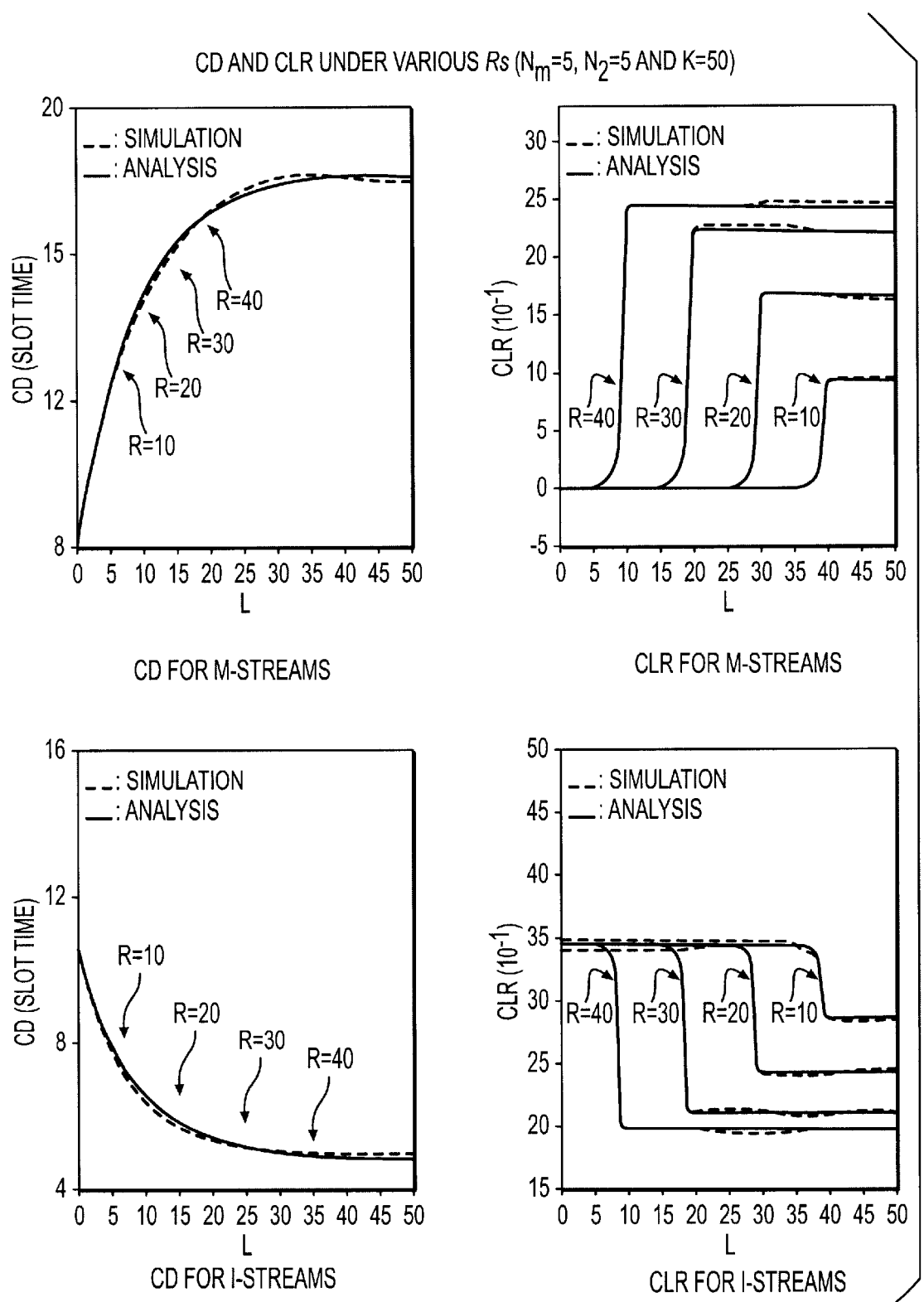

FIGS. 6 to 9, which depict the CD and CLR of a switch with traffic classes M and I, demonstrate profound agreement of analytic results with simulation results. FIG. 6 depicts the CD and CLR of each marked traffic class as a function of L under various Rs and a given set of $N_M$, $N_I$, and K. Although CD is hardly affected by R, CLR is more sensitive to R. In particular, the lower the R, the lower the CLR of M-streams (and the higher the CLR of I-streams). This is because M-cells can push out more I-cells at lower values of R. In addition, the reduction effect of the CLR for M-streams becomes more significant as R decreases. Moreover, the CLR of M-streams has been greatly improved if L is less than the size of the push-out region, i.e., L<K–R. This is because, in this case, newly-arriving M-cells have greater possibility to push out an I-cell in the push-out region.

FIG. 7 exhibits the CD and CLR of each traffic class as functions of L under various burstiness conditions and a given set of $N_M$, $N_I$, R, and K. FIG. 7 shows that CD and CLR both increase with burstiness because an increase in burstiness results in a decrease in statistical multiplexing gain. Furthermore, under the same mean cell arrival rate for an I-stream, the reduction of the CLR for M-streams (the CD for I-streams) lessens (increases) more significantly as the mean ON length of an I-stream decreases.

Figure 8:
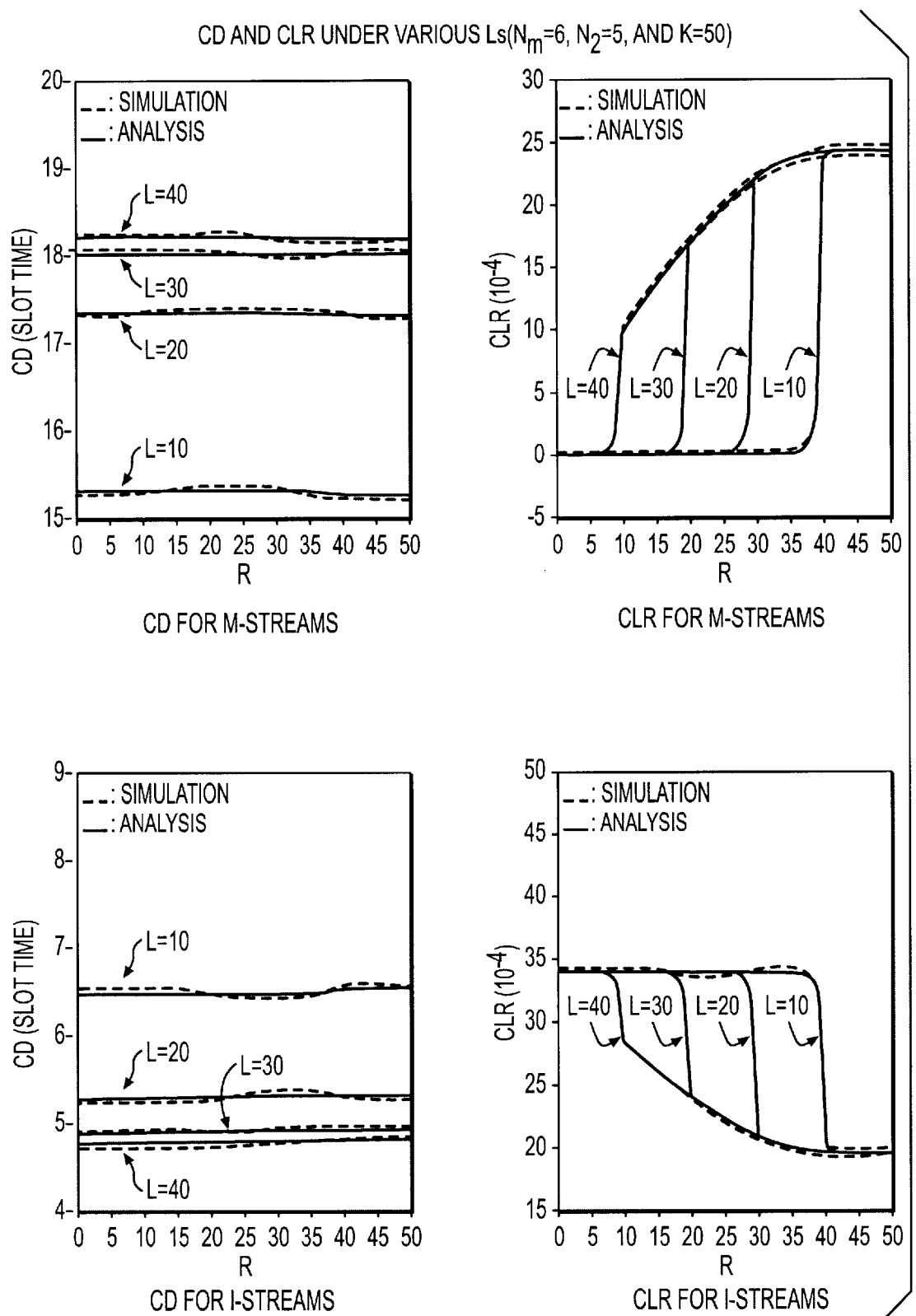

FIG. 8 compares the CD and CLR of each traffic class as functions of R under various Ls and a given set of $N_M$, $N_I$, and K. While CLR is almost entirely unaffected by I, CD is sensitive to L. In fact, CD is remains virtually constant for a given L over the range of R examined. Moreover, the greater the L the lower the CD of I-streams (and the higher the CD of M-streams). The rationale behind this fact is that I-cells can precede more M-cells with higher L. In addition, the reduction effect of the CD for I-streams becomes less significant as L increases.

Figure 9:
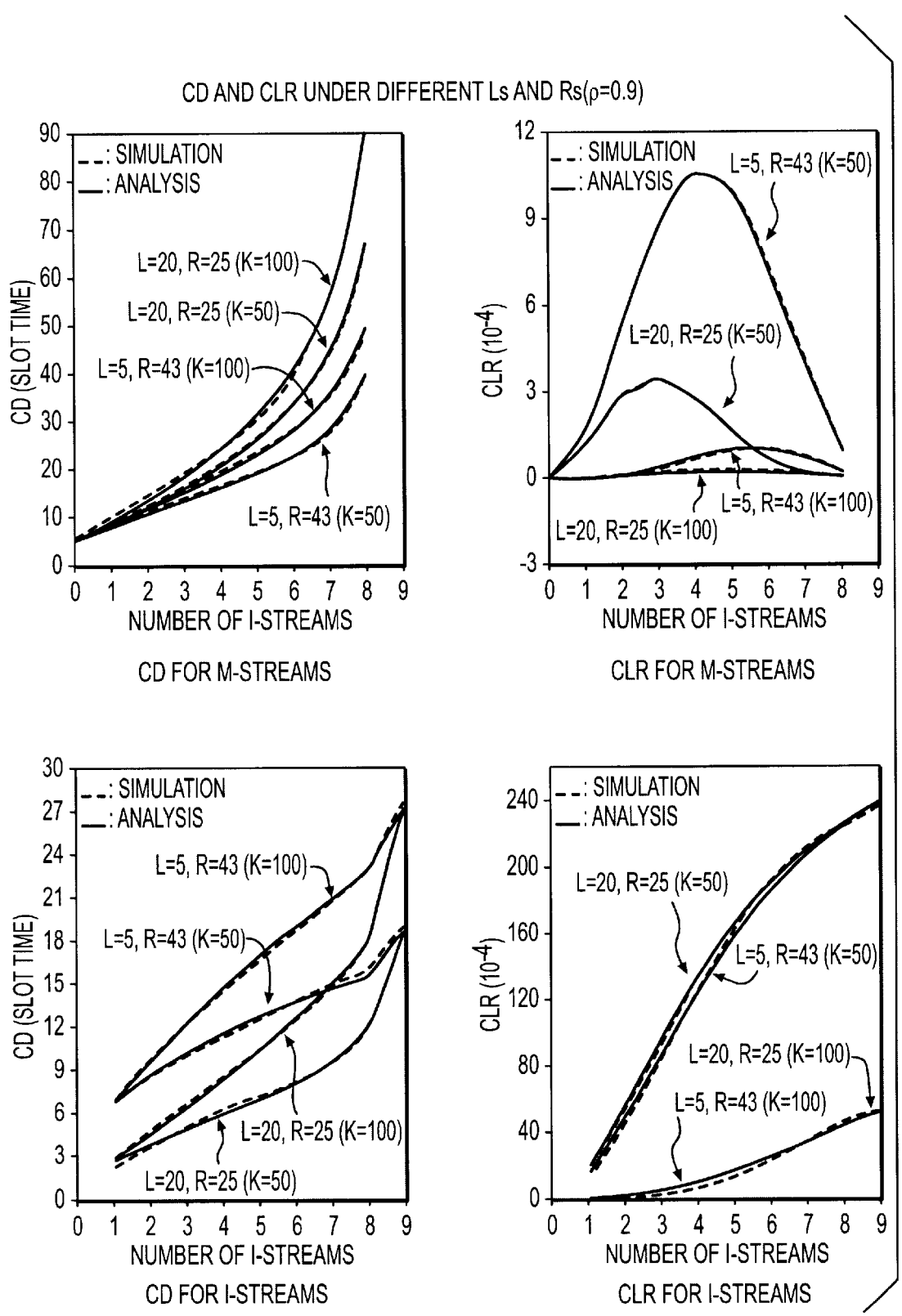

FIG. 9 shows the CD and CLR of each traffic class as function of the number of I-streams under different Ls and Rs and a given set of $\rho$ and K while retaining aggregate loads ($\rho$) of 0.9. The aggregate load is defined as the total traffic load of M-streams and I streams. For example, under an aggregate load ($\rho$) of 0.9 in FIG. 9, an increase in the number of I-streams from 5 (0.1×5) to 6 (0.1×6) causes a decrease in the number of M-streams from 8 (0.05×8) to 6 (0.05×6). Using different Ls and Rs attains various qualities of the CD and CLR for each traffic class. Besides, the greater the L the lower the CD of I-streams, and the lower the R the lower the CLR of M-streams. These results agree with the results exhibited in FIGS. 6 and 8.

Figure 10:
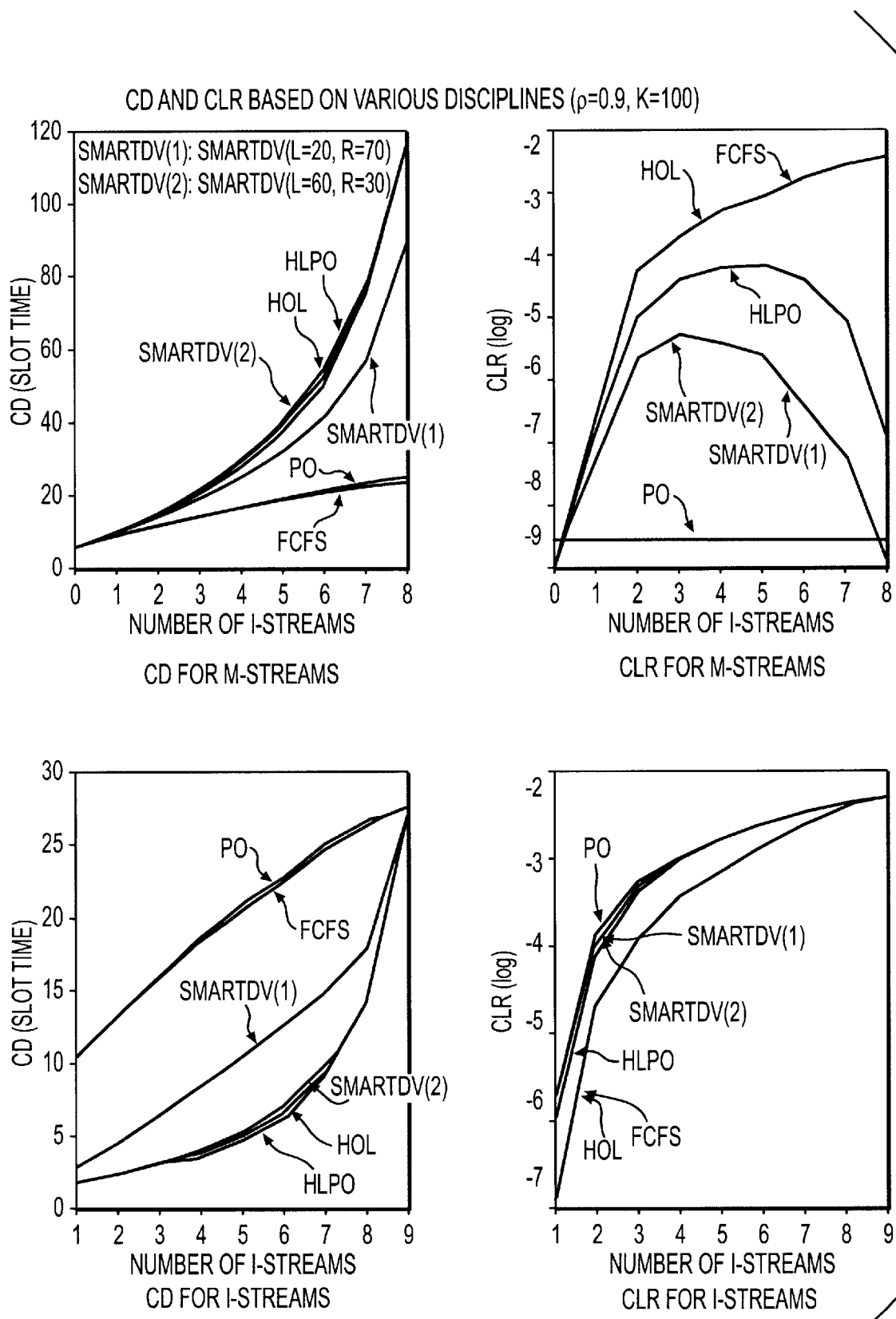

FIG. 10 shows the derived CD and CLR of each traffic class based on various disciplines under a given set of Y and K. In this figure, HOL provides the lowest CD for I-streams but the highest CLR for M-streams. PO gives the lowest CLR for M-streams but the highest CD for I-streams. Because HLPO considers both delay and loss priorities, HLPO greatly improves the CD of I-streams and CLR of M-streams. In addition to considering both delay and loss priorities, the PPP discipline provides adjustments to L and R to achieve various qualities of CD and CLR for each traffic class. The CLR of M-streams based on HLPO is higher than that based on the PPP discipline because under HLPO, the server always serves I-cells as long as there are I-cells in the queue.

Figure 11:
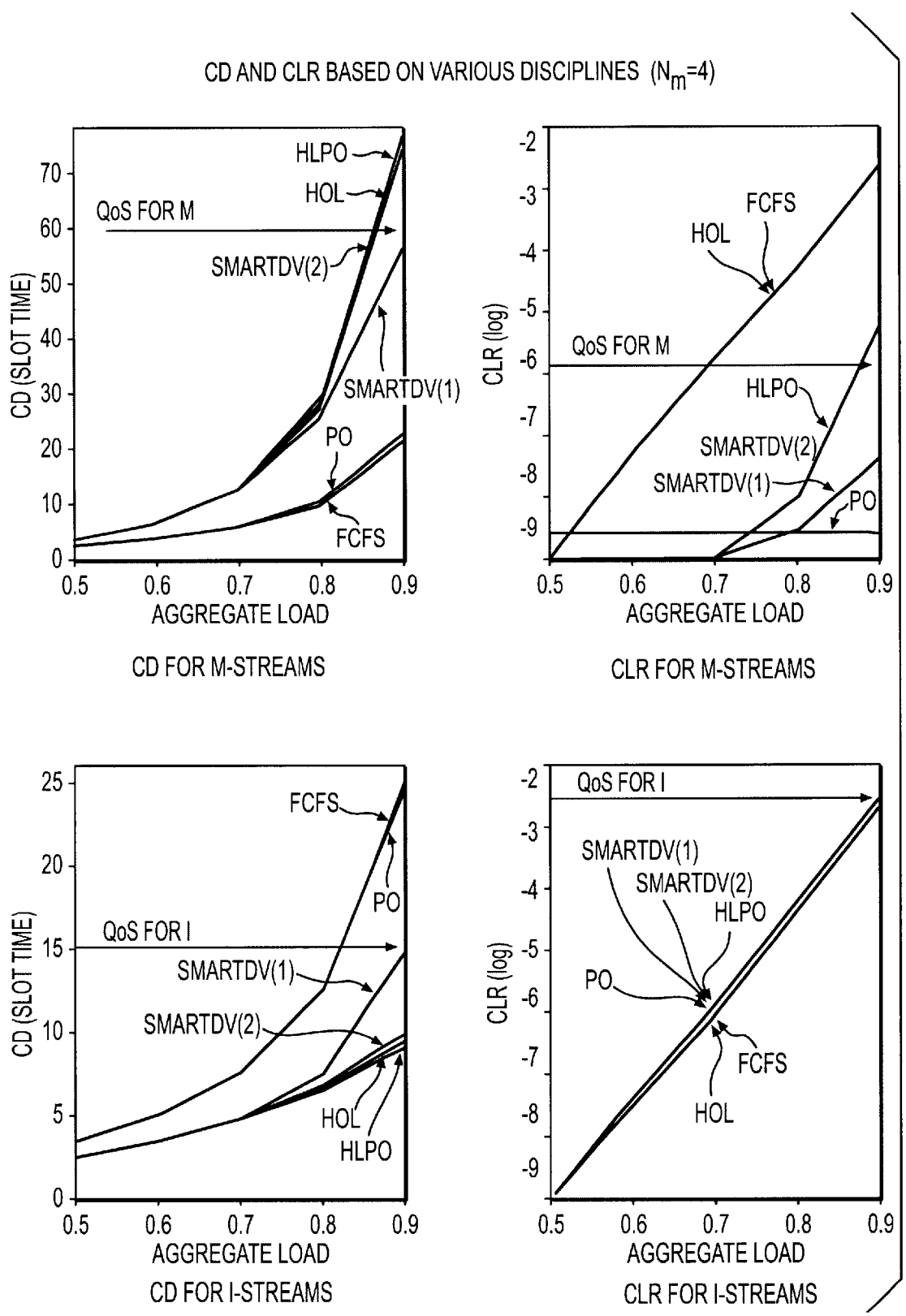
FIG. 11 shows diagrams of the behavior of cell delay and cell loss ratio for traffic classes based on various disciplines under a given set of conditions.

FIG. 11 shows the derived CD and CLR of each traffic class based on various disciplines under a given set of $N_M$ and K. As this figure demonstrates, to support satisfactory QoSs for each traffic class, switch utilization (i.e., aggregate load) must be below 0.6 under FCFS or HOL. By using PO, HLPO, or the PPP discipline with L=60 and R=30, switch utilization can be increased to 0.8 while still maintaining adequate QoS. Furthermore, using L=20 and R=70, the PPP disciple consistent with this invention further improves performance and allows switch utilization to go as high as 0.9. Thus, proper settings of L and R can permit high switch utilization.

D. Conclusion

A PPP scheduling discipline supporting two delay and two loss priorities in ATM switches encompasses four disciplines namely FCFS, HOL, PO, and HLPO, by properly setting two thresholds L and R. Both cell delay of high-delay priority cells and cell loss ratio of high-loss-priority cells are greatly improved resulting in tolerable performance degradation for cells of other classes. Moreover, the greater the L the lower the cell delay for high-delay priority cells, and the lower the R the lower the cell loss ratio for high-loss-priority cells. In addition, the cell loss ratio for high-loss-priority cells is greatly improved if L is set to less than the size of the push-out region. Finally, in addition to improving cell delay and loss QoSs, the PPP discipline consistent with this invention also permits high switch utilization.

Other embodiments of the invention will be apparent to those skilled in the art from consideration of the specification and practice of the invention. For example, persons of skill in the art will recognize many other implementations of the PPP discipline. The specification and examples should be considered as exemplary. The true scope and spirit of the invention are determined by the following claims.

What is claimed is:

1. A scheduling method comprising:

determining whether a queue is full;

placing a newly-arriving cell into the queue before a predetermined number of low-delay-priority cells in the queue, if the queue is not full and the newly-arriving cell is a high-delay-priority cell; and placing the newly-arriving cell into the queue in place of a selected low-loss-priority cell, if the queue is full, the newly-arriving cell is a high-loss-priority cell, and the selected low-loss-priority cell is located beyond a predetermined location in the queue.

2. The method of claim 1, further comprising:

placing the newly-arriving cell at the end of the queue, if the queue is not full and the newly-arriving cell is not a high-delay-priority cell.

3. The method of claim 1, further comprising:

discarding the newly-arriving cell, if the queue is full and the newly-arriving cell is not a high-loss-priority low-loss-priority cell.

4. The method of claim 1, further comprising:

discarding the newly-arriving cell, if the queue is full and no low-loss-priority cell is located beyond the predetermined location in the queue.

5. The method of claim 1, further comprising:

determining whether the newly-arriving cell is a high-delay-priority cell, if the queue is not full; and determining whether the newly-arriving cell is a high-loss-priority cell, if the queue is full.

6. The method of claim 1, further comprising:

automatically determining the predetermined number.

7. The method of claim 6, wherein automatically determining the predetermined number comprises:

using a neural network.

8. The method of claim 1, further comprising:

automatically determining the predetermined location.

9. The method of claim 8, wherein automatically determining the predetermined location includes using a neural network.

10. An apparatus, comprising:

a queue; and a processor for controlling entry of cells into the queue, the processor including means for determining whether the queue is full;

means for placing a newly-arriving cell into the queue before a predetermined number of low-delay-priority cells in the queue, if the queue is not full and the newly-arriving cell is a high-delay-priority cell; and means for placing the newly-arriving cell into the queue in place of a selected low-loss-priority cell, if the queue is full, the newly-arriving cell is a high-loss-priority cell, and the selected low-loss-priority cell is located beyond a predetermined location in the queue.

11. The apparatus of claim 10, wherein the processor further comprises:

means for placing the newly-arriving cell at the end of the queue, if the queue is not full and the newly-arriving cell is not a high-delay-priority cell.

12. The apparatus of claim 10, wherein the processor further comprises:

means for discarding the newly-arriving cell, if the queue is full and the newly-arriving cell is not a high-loss-priority cell.

13. The apparatus of claim 10, wherein the processor further comprises:

means for discarding the newly-arriving cell, if the queue is full and no low-loss-priority cell is located beyond the predetermined location in the queue.

14. The apparatus of claim 10, wherein the processor further comprises:

means for determining whether the newly-arriving cell is a high-delay-priority cell, if the queue is not full; and means for determining whether the newly-arriving cell is a high-loss-priority cell, if the queue is full.

15. The apparatus of claim 10, wherein the processor further comprises:

means for automatically determining the predetermined number.

16. The apparatus of claim 15, wherein the means for automatically determining the predetermined number comprises:

a neural network.

17. The apparatus of claim 10, wherein the processor further comprises:

means for automatically determining the predetermined location.

18. The apparatus of claim 17, wherein the means for automatically determining the predetermined location comprises:

a neural network.

* * * * *